United States Patent Office

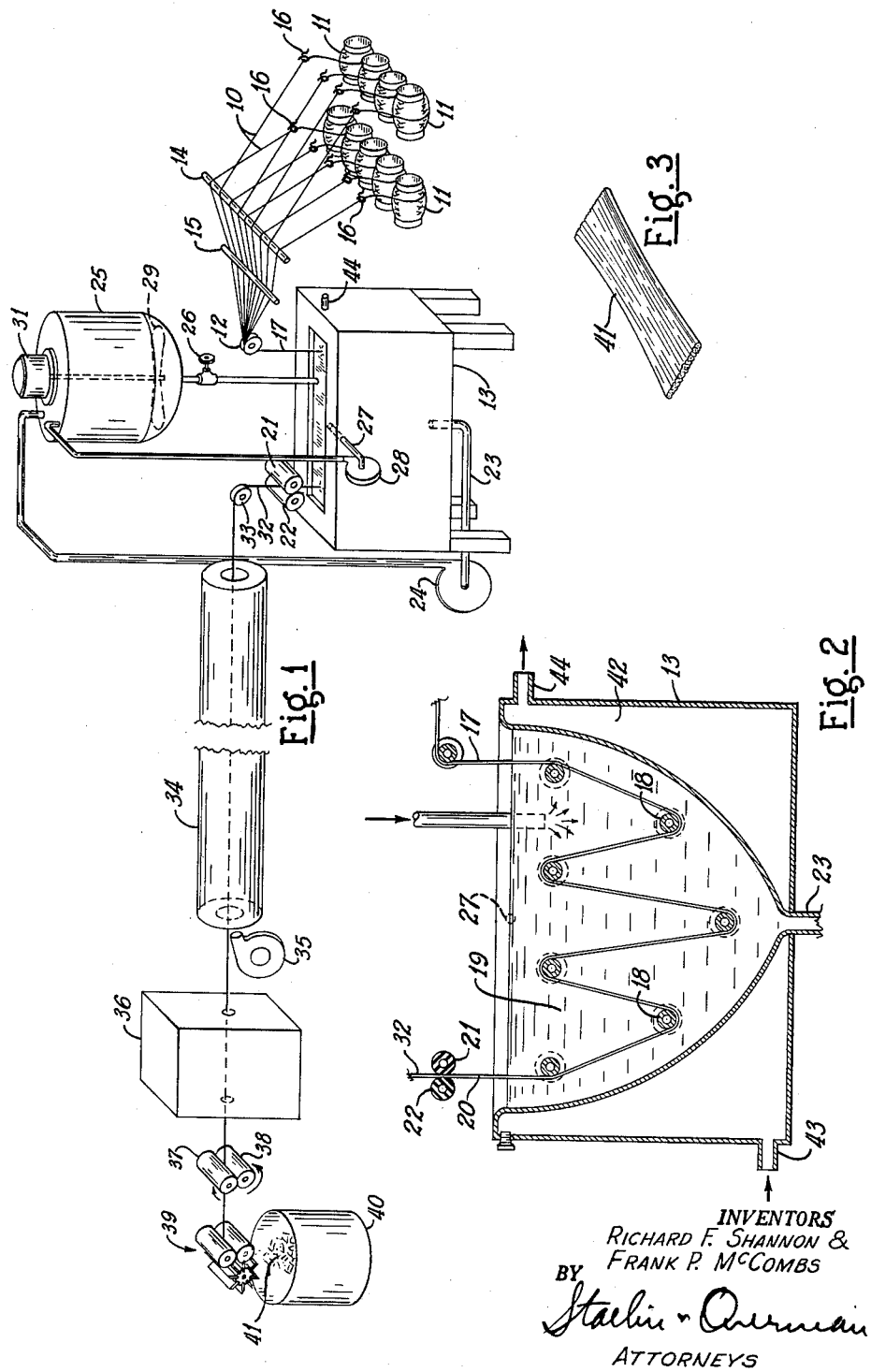

3,158,519
Patented Nov. 24, 1964

3,158,519
CONTINUOUS PROCESS FOR PRODUCING
MOLDING COMPOUNDS
Richard F. Shannon, Lancaster, and Frank P. McCombs,
Granville, Ohio, assignors to Owens-Corning Fiberglas
Corporation, a corporation of Delaware
Filed June 30, 1960, Ser. No. 39,836
2 Claims. (Cl. 156—180)

This invention relates to combining a resinous and a fibrous material in a moldable compound and particularly to a continuous process and apparatus for carrying out the process.

Molding compounds comprising a partially polymerized thermosetting material and suitable fiber or fibers and a thermoplastic material have been produced formerly. Such molding compounds generally comprise fibers cut to length and a binder material which can be reformed into a desired shape as by molding or the like. Complete uniformity of each unit of the molding compound and proper mixing of compatible materials are difficult to achieve and past molding compound products are not entirely satisfactory with respect to these properties.

It is an object of this invention to provide an improved and continuous process for producing a molding compound.

It is an object to produce a mineral fiber reinforced thermosetting molding compound.

It is a further object to combine glass fibers and a resinous material to provide a moldable product.

It is still a further object to provide an improved resin synthesized specifically for combination with fibrous material which is then chopped and thereby formed into a uniform product that can be molded or otherwise formed into a reinforced product.

The invention will be better understood by reference to the accompanying drawing in which:

FIGURE 1 is a perspective view of the apparatus utilized in carrying out the process;

FIGURE 2 is a view, partly in section, of the immersion tank which combines a resin composition and fibers;

FIGURE 3 is a perspective view of a flattened ribbon of fiber and resin; and

Figure 4:
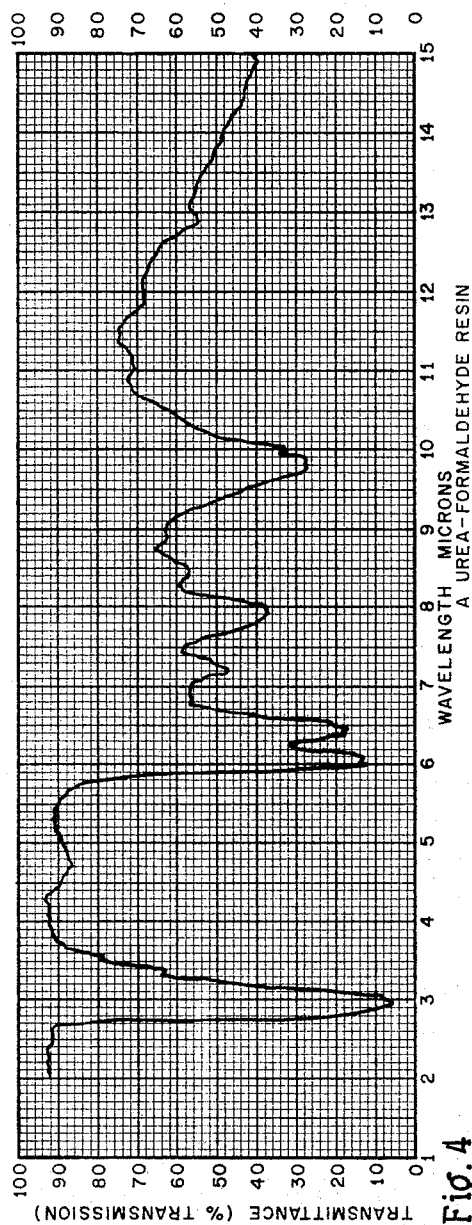
Figure 5:
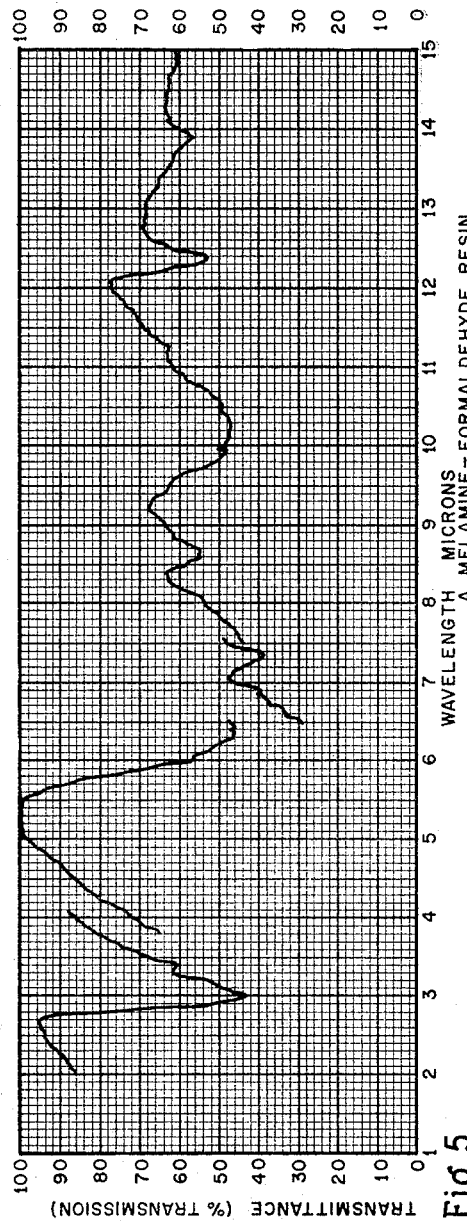

FIGURES 4 and 5 identify suitable resins for molding compounds.

In FIGURE 1 a plurality of textile strands 10 are pulled off of package 11, and gathered together on a gathering wheel 12 in the form of a roving which is advanced into immersion tank 13. A roving may be the starting material instead of individual strands. Before the textile strands 10 are gathered together on the gathering wheel 12 to form a roving, they may be passed over tensioning bars 14, 15 to apply some tension to the strand as it is advanced. Strands from the packages 11 are directed through individual guide eyes 16 as the strands leave the package. Roving 17 is directed over one or more rolls 18 that are submerged in the aqueous resin bath 19. As the roving passes over the rolls 18, it becomes flattened to form a ribbon of material that takes up resin as it passes through the resin bath. The roving or ribbon is worked when it changes direction as it passes over the rolls and such action causes the resin to impregnate the ribbon completely so that uniform pick-up is assured.

The impregnated, multi-strand ribbon 20 passes between a pair of rubber wiper rolls 21, 22, the action of which removes excess resin to provide a constant resin to fiber ratio. The immersion tank 13 is provided with a resin recirculating system. Resin is removed from the bottom of the tank through pipe 23 and is pumped by pump 24 into reservoir 25. Resin flow from reservoir 25 is controlled by valve 26 which limits flow by gravity from the reservoir into immersion tank 13. Since the level within the immersion tank has been found to be critical, excess resin is directed into the immersion tank through valve 26 and then the excess resin is removed at the top of the tank through pipe 27 and the excess resin is then pumped up into the reservoir 25 by pump 28. Reservoir 25 is provided with a propeller 29 driven by electric motor 31. The resin bath within the immersion tank is constantly recirculated and the level within the immersion tank is maintained constant by gravity flow and the action of pump 28.

The flattened ribbon of material 32 coming from wiper rolls 21, 22 passes over idler roll 33 and is then directed into the elongated oven 34. The oven is heated by electrical resistance elements appropriately spaced throughout the length of the oven and by hot air which is directed into the exit end of the oven by a blower 35. The textile strand product, which has the resinous material metered thereon, is heated within the oven so that the resin advances to a non-tacky or partially advanced stage and moisture is removed from the resinous material. The resultant resin and textile strand product is then directed through a chamber 36 which has an atmosphere of a suspended powder that coats the product with powder to assure that individual pieces of the chopped product 41 do not adhere one to another.

Pull rolls 37, 38 advance the ribbon of resin and textile strands at a constant and uniform rate. Constant advancement of the material is necessary in order to insure a uniform immersion time and to assure a constant resin to fiber ratio. Pull rolls 37 and 38 are synchronized with the rolls of chopper 39 which cut the ribbon product into the desired length. The chopped product then drops into container 40. The molding compound product 41 can be stored, transported and used in molding processes to form reinforced resin products. Generally the molding compound is heated as it is molded and pressed into final form. Such heating advances the resin to a fully cured stage so that the ultimate strengths and physical properties are obtained.

In utilizing the apparatus shown, it may be desirable to by-pass some of the rolls shown in the immersion tank in order to reduce the tension on the material which is being passed thereover. The tension placed upon the roving and the amount of working of the roving within the resin is varied by threading the roving over any desired number of rolls within the tank. The roving and flattened ribbon formed therefrom should desirably have some tension, however, undue tension can result in breaking the roving or in non-uniform resin to fiber ratios. In order to provide a constant resin-to-fiber ratio, it has been desirable to control the viscosity and the level of the resin bath within close limits. It is preferred to have pneumatic rolls at the immersion tank so that the wiping action is constant.

Multiple zone ovens may be used, if desired. Generally, if a two-zone oven is used, the first zone has a higher temperature than the second. It has been found highly desirable to utilize an air blower to remove vapor from the oven when an aqueous resin system is used in the immersion tank. Water vapor is removed from the resin on the roving within the oven; thus it becomes necessary to remove moisture from the oven to prevent build-up of moisture in the oven. Production speeds of a uniform product have been tripled by adequate and controlled moisture removal.

Chamber 36 may utilize any of several means for forming a suspension of powders therein. One suitable apparatus comprises a rapidly rotated roller which disperses powder into the atmosphere within the chamber as the powder is directed onto its rotating surface. Conventional fiber cutters comprise a rubber-covered roller with an adjacent knife-roll such as that shown.

Various resin systems can be utilized, however, merely to illustrate the invention, an aqueous phenolic resin system will be fully described. A suitable phenolic resin having a formaldehyde to phenol molar ratio of from 1.5:1 to 1.9:1 may be used. A 1.7:1 formaldehyde to phenol ratio resin is prepared as follows: 24 parts of 100% U.S.P. phenol, 3.9 parts of 37% formaldehyde and 12.1 parts of 95% paraformaldehyde are placed in a reaction kettle and mixed at room temperature. To this mixture is added 0.6 part of 50% sodium hydroxide. After 5 minutes the reactants are heated up to 145° F. and after 55 minutes another 0.7 part of 50% sodium hydroxide is added while the temperature of the reactants is maintained at 145° F. After an additional 10 minutes, it is necessary to control the temperature of the reactants with cooling water in a jacket about the resin kettle. The temperature of the reactants is maintained at from about 155° F. to 165° F. and the viscosity of the reactants is checked repeatedly with a Gardner Bubble Viscometer. The viscosity goes from an "E" viscosity at 80 minutes elapsed time after the kettle was first charged to "F" at 95 minutes, "G" at 120 minutes, "H" at 155 minutes, "I" at 175 minutes, "J" at 205 minutes, and "M" at 230 minutes. When the viscosity reaches "M," cooling water is turned on and the reactants neutralized to a pH of 7.5 by an addition of 75% $H_3PO_4$ through a tube, the discharge end of which is submerged in the resin. After the addition of phosphoric acid, the resin is filtered to remove substantially all insoluble material from the reactants. Less than ½% of insoluble material remains in the resin after filtering. Analysis of the finished resin shows a pH of 7.4, a refractive index of 1.38, a stroke cure of 210 seconds and 68.44% solids, see Example 3.

The resin system preferably comprises a resin synthesized specifically for this present use. Tailor-made resins having the required flow characteristics for molding have been synthesized. The following examples illustrate methods of preparing suitable phenolic resins.

EXAMPLE 1

[Mol ratio formaldehyde-phenol—1.5:1]

| No. | Material | U.S.P. Grade, percent | Parts by Weight |
|---|---|---|---|
| 1 | Phenol | 100 | 24.00 |
| 2 | Formaldehyde | 37 | 3.20 |
| 3 | Paraformaldehyde | 91 | 11.33 |
| 4 | Sodium Hydroxide | 50 | 1.33 |
| 5 | Water | | 1.80 |

*Resin Synthesis*

| Elapsed Time in Minutes | Temperature of Reactants, ° F., | Procedure |
|---|---|---|
| 0 | 70 | Charge reaction kettle with materials 1, 2, and 3. |
| 0–6 | 70 | Stirrer on, then add 0.66 part material No. 4. |
| 6–60 | 160 | Raise temperature of reactants at not over 3° F. per minute. |
| 60–66 | 160 | Add 0.66 part of material No. 4. |
| 66–205 | 160 | Hold temperature constant. |
| 205 | 160 | Add material No. 5. |
| 205–265 | 160 | Hold temperature constant. Check Gardner Holdt viscosity each 15 minutes. |
| 265 | 160 | Neutralize to 8.9 pH with 75% $H_3PO_4$. Cool to room temperature. Filter. |

Analysis of finished resin:
 pH=8.95.
 Viscosity=M.
 Specific Gravity=1.5536.
 Percent Solids=65.77.

EXAMPLE 2

[Mol ratio formaldehyde-phenol—1.6:1]

| No. | Material | U.S.P. Grade, percent | Parts by Weight |
|---|---|---|---|
| 1 | Phenol | 100 | 5.63 |
| 2 | Formaldehyde | 37 | 3.37 |
| 3 | Paraformaldehyde | 95 | 1.71 |
| 4 | Sodium Hydroxide | 50 | 0.16 |

*Resin Synthesis*

| Elapsed Time in Minutes | Temperature of Reactants, ° F., | Procedure |
|---|---|---|
| 0 | 70 | Charge reaction flask with materials 1, 2, and 3. |
| 0–6 | 70 | Add 0.08 part of material No. 4. |
| 6–70 | 160 | Control exotherm from addition of No. 4 with cooling; allow temperature to increase at not over 3° F. per minute. |
| 70–150 | 160 | Hold temperature constant. |
| 150–156 | 160 | Add 0.08 part of material No. 4. |
| 156–225 | 160 | Hold temperature constant. Check Gardner Holdt viscosity every 15 minutes. Check stroke cure every 15 minutes. |
| 225 | 160 | Cool to room temperature. Neutralize with 75% $H_3PO_4$ to 8.0 pH. Filter. |

Analysis of finished resin:
 pH=8.2.
 Viscosity=N.
 Stroke Cure=2 minutes 30 seconds.
 Refractive Index=1.508.
 Percent Solids=71.70.

EXAMPLE 3

[Mol ratio formaldehyde-phenol-1.7:1]

| No. | Material | U.S.P. Grade, percent | Parts by Weight |
|---|---|---|---|
| 1 | Phenol | 100 | 24.00 |
| 2 | Formaldehyde | 37 | 3.88 |
| 3 | Paraformaldehyde | 95 | 12.13 |
| 4 | Sodium Hydroxide | 50 | 1.33 |

*Resin Synthesis*

| Elapsed Time in Minutes | Temperature of Reactants, ° F., | Procedure |
|---|---|---|
| 0 | 72 | Charge kettle with materials 1, 2, and 3. |
| 0–5 | 72 | Add 0.66 part of material No. 4. |
| 5–60 | 145 | Heat to temperature. |
| 60–70 | 145 | Add 0.66 part of material No. 4. |
| 70 | 165 | Control exotherm with cooling water. |
| 80 | 160 | Check Gardner Holdt viscosity E. |
| 95 | 155 | Viscosity F. |
| 120 | 160 | Viscosity G. |
| 155 | 165 | Viscosity H. |
| 175 | 158 | Viscosity I. |
| 205 | 158 | Viscosity J. |
| 230 | 162 | Viscosity M. Stroke cure 230 seconds. Cooling water on neutralize to pH 7.5 with 75% $H_3PO_4$, filter. |

Analyses of finished resin:
 pH=7.4.
 Refractive Index=1.3800.
 Stroke Cure=210 seconds.
 Percent Solids=68.44.

EXAMPLE 4

[Mol ratio formaldehyde-phenol—1.7:1.0]

| No. | Material | U.S.P. Grade, Percent | Parts by Weight |
|---|---|---|---|
| 1 | Phenol | 100 | 4.35 |
| 2 | Formaldehyde | 37 | 1.89 |
| 3 | Paraformaldehyde | 95 | 1.61 |
| 4 | Water | | 1.00 |
| 5 | $Ba(OH)_2 \cdot 8H_2O$ | Technical | 0.57 |

Resin Synthesis

| Elapsed Time in Minutes | Temperature of Reactants, °C., | Procedure |
|---|---|---|
| 0 | 25 (77° F.) | Charge reactor with materials 1, 2, 3, and 4. |
| 0 | 70 (158° F.) | Heat to 70° C. Start barium hydroxide addition. |
| 60 | 78 | Continue heating. |
| 90 | 78 | 0.1 part barium hydroxide has been added. |
| 165 | 78 | 0.3 part barium hydroxide has been added. |
| 195 | 70 | Add 0.01 part 50% NaOH. |
| 225 | 70 | |
| 235 | 72 | Add 0.01 part NH$_4$OH. |
| 240 | 70 | Add 0.1 part barium hydroxide. |
| 275 | 70 | Add 0.07 part barium hydroxide. |
| 335 | 85 | 7.9 pH, heat on. |
| 355 | 96 | |
| 365 | 96 | Start cooling water. Cool to room temperature, neutralize with 75% H$_2$SO$_4$, and filter. |

Analysis of finished resin:
pH = 8.9.
Viscosity = M+.
% Solids = 64.03.

The resins of Examples 1–4 were combined with calcium carbonate (Millical) to achieve a filler to resin ratio of 30:70 in an aqueous system having from 65–75% solids. The resin was combined with 60 end fibrous glass roving so that glass content in the molding compound was from 45–46.5% by weight. The following properties were achieved:

Physical Properties

| Resin | Roving size (60 end even tension) | Flexural strength | | Flexural modulus (×10$^6$ p.s.i.) | Impact strength (face notched) (ft. lbs./in. notch) | H$_2$O absorpt. (percent 24 hrs.) | Ignition loss (percent) |
|---|---|---|---|---|---|---|---|
| | | Max. (×10$^3$ p.s.i.) | PEL (×10$^3$ p.s.i.) | | | | |
| Example 1 | 801 (2,931,739) | 14.1 | 6.5 | 2.0 | 10.4 | 1.26 | 45.4 |
| Example 3 | 801 | 13.1 | 7.3 | 1.8 | 13.2 | 0.82 | 46.4 |
| Example 4 | 801 | 13.4 | 4.7 | 1.4 | 17.1 | 0.35 | 41.5 |
| A | Garan | 8.3 | 2.1 | 1.6 | 9.5 | 1.97 | 36.4 |
| B | Garan | 9.1 | 1.8 | 1.7 | 11.1 | 2.45 | 39.2 |

NOTE.—Compositions A and B are commercially available phenolic molding compounds having properties that represent formerly available materials A deionized phenol formaldehyde resin can be prepared by passing one of the resins from Examples 1 to 3 (before neutralization with 75% phosphoric acid) through an ion exchange column containing an ion exchange resin converted to the ammonia form. Conventional phenolic resins contain up to 4% alkali and varying amounts of iron; these impurities have a deleterious effect upon glass, resins and upon glass-resin bonds. Removal of these impurities results in the conversion of the impure phenolic resin into high quality, metallic and alkali ion free resins which exhibit higher wet strengths and lower moisture absorption when combined with fibers and which have good flow characteristics and cure to a uniform product whether combined with fibers or not.

The Stroke Cure Test of the phenolic resin is carried out on a Thermo-Electric Cure Plate manufactured by the Thermo-Electric Company, Cleveland, Ohio. The Cure Plate is maintained at a temperature of precisely 150° C. One-half teaspoonful of the liquid phenolic resin is poured on the surface of the Cure Plate and a stopwatch is started. A resin sample is stroked uniformly at a rate of from 75–85 strokes per minute in a 1½ inch square area by means of a spatula having a 6 inch blade. The resin is considered cured when it pulls from the Cure Plate surface in long strings of about 6 inches. The stopwatch is stopped when strings can be pulled and the time is noted.

The resin bath utilized in the immersion tank normally comprises a resin modified by adding a filler, a coupling agent which couples the resin to the glass surface, and a material which promotes flowability of the resins. The coupling agents may be any of the well-known silane compounds such as vinyl tris beta methoxy ethoxy silane, vinyl triethoxy silane, vinyl trichloro silane, diallyl diethoxy silane, sodium vinyl siloxanolate, gamma amino propyl triethoxy silane, delta amino butyl methyl diethoxy propyl triethoxy silane, 3,6 diamino dipropyl trimethoxy silane, gamma propyl amino N ethyl amino trimethoxy silane and others. Materials which are known to promote flowability are aniline, polyethylene glycol, or others added in percentages of from about .25–4% or upwards to 5% of the total resin mix. Suitable fillers include materials such as precipitated calcium carbonate (Millical) having a particle size of from 0.25–5 microns and clays such as Hydrite-MP which has an average particle diameter of 9.5 microns. Clays having an average particle size of from about 1–15 microns are believed to be satisfactory. Fillers reduce cost, improve moldability, reduce crazing, promote uniform flow in the mold and higher viscosity when under pressure.

Other resins can be used with or without clay and calcium carbonate fillers. A melamine-formaldehyde resin (Melmac 405 S) was applied to a sixty-end roving to produce a good molding compound. This resin is identified by the infrared spectrum shown in FIGURE 5 of the drawings. Fifteen hundred (1500) parts by weight of this resin were mixed with an equal weight of water and with one thousand (1000) parts of aluminum silicate filler. A molding compound comprising 43–45% by weight glass in the form of sixty-end roving and the melamine-formaldehyde resin was prepared utilizing the apparatus disclosed. The oven temperature was maintained at 400° F. ±5° F. Excellent molding characteristics were achieved with this product. Urea-formaldehyde resins can also be used and various combinations of phenol-formaldehyde, urea-formaldehyde, and/or melamine-formaldehyde, or any combination of these can be used in the resin system. A urea-formaldehyde resin suitable for use in accordance with the teachings is identified by the infrared spectrum of FIGURE 4.

When a high temperature product is to be produced, the conventional textile glass fibers are replaced with leached glass fibers or with silica fibers. Such fibers are able to withstand high temperatures without slumping or melting. Other ways of upgrading temperature resistance include treatment of the glass fibers with a metal hydroxide gel such as those of aluminum, chromium, magnesium, zirconium, and titanium. Formation of a metal hydroxide gel in situ on the surfaces of fibers has been found to provide added heat resistance to the fibers.

It is desirable to apply to the glass fibers as they are produced a forming size which is compatible with the resin with which it is to be combined. An aftertreatment may be applied to the fibers after they are formed if the forming size is not applied or has been removed. Forming sizes especially suited for use with fibers to be combined with phenolic resin systems are fully disclosed in U.S. Patent 2,931,739, issued to Marzocchi and Janetos. A suitable size includes a film former, lubricant and a coupling agent such as vinyl trichloro silane, gamma amino silane, vinyl tris beta methoxy ethoxy silane, beta carbethoxy ethyl methyl diethoxysilane, beta carbethoxyethyl triethoxy silane, diallyl diethoxy silane, vinyl triethoxy silane, 3,6 diamino dipropyl trimethoxy silane, gamma propyl amino N ethyl amino trimethoxy silane, sodium vinyl siloxanolate, a Werner complex compound and the like. These size ingredients are emulsified with water and a proportion of an emulsifying agent is generally added to maintain the proper emulsion. The silane compound added to the resin slurry may be the same compound as the coupling agent added to the size composition applied to the fibers to enhance further the resin to glass adhesion after the molding compound has been molded and the resin therein advanced to a completely set condition.

It has been found that when utilizing the equipment shown in the drawings, resin systems having a viscosity of from 750–1500 centipoises at the operating temperature are preferably used. The operation temperature of the resin system when using aqueous phenolic systems such as those disclosed above can be room temperature (70–75° F.). However, if it is desirable, the operating temperature may be varied either higher or lower by the use of the jacket shown disposed around the immersion tank. Water of the desired temperature is circulated through this jacket to set and to stabilize the temperature of the resin system at the desired temperature level. The heating or cooling liquid is introduced into jacket 42 through inlet 43 and removed through outlet pipe 44. It is possible to add water to the resin system if the viscosity of the resin goes above 1500 centipoises. An addition of water can be made to reduce the viscosity to within the desired range of 750–1500 centipoises.

When utilizing a filler in the resin system, the resin to filler ratio is preferably 60:40. The product then contains about 50% by weight glass, 30% resin and 20% filler. Ratios of resin to filler were varied from about 60:40 to 80:20. These ratios provide products that have good molding characteristics and physical properties. The phenolic resins synthesized as disclosed above are dehydrated to about 63% solids content and then the filler is added directly to the resin using a high-speed Eppenbach mixer to disperse the filler in the resin solution. If the viscosity is too low, the process is difficult to operate and usually causes uneven impregnation of the textile roving with the resin. If the viscosity of the resin filler mix is near the high end of the range (1500 centipoises) and if the total solids content is relatively high while the desired resin to filler ratio is maintained, less operating difficulties are encountered. The resin bath is thoroughly mixed and maintained in a uniformly mixed condition by the agitation and recirculation of the resin bath. The viscosity and solids content of the resin system are very important from a processing standpoint.

It is desirable to apply an excess of resin to the textile roving and then the excess is controllably removed to provide a constant resin to glass ratio. Resin filler mixes having total solids content in the 65–75% range and viscosities of approximately 1250 centipoises are used with no process difficulties being encountered when using phenolic resins. Phenolic resin coated roving emitting from the squeeze rolls contains from about 25–35% water and is extremely tacky. In order to produce a non-tacky moldable composition, the coated roving is passed through a heated zone which removes excess moisture and advances the resin to a dry, non-tacky, partially advanced or "B" stage. A 6 unit electrically heated horizontal oven is used to dry and advance the resin. If a 2 zone oven is utilized, water is flashed off in the first zone which is maintained at a temperature of from about 480–500° F. and the resin is advanced somewhat. In the second zone, the remainder of the water is removed and advancement of the resin to a non-tacky "B" stage is completed. The temperature in the second zone is maintained at about 380° F. The temperature in the second zone is preferably less than the temperature in the first zone.

A single zone oven may be utilized and temperatures of from 300–500° F. and preferably from 400–450° F. are utilized. If the curing temperature is in excess of about 480° F., it appears that the resin dries too rapidly at the surface and traps water inside the roving. Non-uniform results are likely to be encountered if too high curing temperatures are used in a one zone oven. Line speeds of from 15–25 feet per minute at oven temperatures of from 400–420° F. produce uniform non-tacky moldable compound if rapid circulation of air within the oven is maintained.

It has been found that the most critical process variable is maintenance of proper air flow within the curing oven. It is necessary to circulate air and at the same time maintain the desired temperature. Hot air is introduced either at the exit or entrance end of the oven and exhausted from the opposite end from which it is introduced.

The molding compositions are somewhat tacky when they come out of the oven; however, the materials are run through a cloud chamber of zinc stearate and then through the rubber pull rolls which flatten the product into dry ribbons of from $3/16$ to $1/4$ inch width. After dusting with zinc stearate and air cooling, the flat ribbons are cut into one inch lengths and can be stored for long periods of time if the particles are placed in sealed containers that are maintained at a temperature below 50° F.

The product is molded with ease. A preform can be prepared by heating the molding compound at 150° F. at a pressure of 50 pounds per square inch for about 1 minute. The preform is then placed in a positive pressure matched metal mold and subjected to 310° F. and 3200 pounds per square inch for a period of 7 minutes. Excellent molded pieces can thus be formed with no process difficulty. Molded samples prepared utilizing a clay extended barium hydroxide catalyzed resin system such as that of Example 4 resisted moisture and water absorption and, in fact, absorbed only 0.35% moisture in 24 hours. This resistance to water is greatly improved over other samples tested.

Various modifications and variations may be made within the spirit and scope of the appended claims.

We claim:
1. Method of producing a thermosetting resin molding compound comprising gathering a plurality of glass strands to form an advancing roving, combining said advancing roving with an aqueous slurry of phenolformaldehyde resin and a filler having an average particle diameter less than about 15 microns selected from the group consisting of clay and calcium carbonate, said slurry having a resin to filler ratio of from 60:40 to 80:20 and a viscosity of from 750–1500 centipoises at from 70–75° F., flexing the roving to accomplish substantially complete impregnation of the roving, adjusting the resin to roving ratio by removing excess resin so that the glass content of the mix is from about 45 to 46.5% by weight, partially curing the phenol-formaldehyde resin to produce a choppable roving and resin composite, and chopping the composite to form moldable particles.

2. A molding compound comprising glass fibers having an organosilane compound on the glass surfaces, and thoroughly mixed with said fiber a partially cured, dried deposit of an aqueous slurry comprising phenol-formaldehyde resin prepared with a formaldehyde to phenol ratio of from 1.5:1 to 1.9:1, an organosilicon compound for promoting compatibility between the glass fibers and phenol-formaldehyde resin, a filler from the group consisting of precipitated calcium carbonate having a particle size of from 0.25 to 5 microns and clays having an average particle size of from 1 to 15 microns, and a flow promoter from the group consisting of aniline and polyethylene glycol, the resin to filler ratio being from about 60:40 to 80:20, and the glass fibers being from 45 to 46.5% of the total weight of the molding compound.

References Cited in the file of this patent

UNITED STATES PATENTS

| | | |
|---|---|---|
| 2,541,896 | Vasileff et al. | Feb. 13, 1951 |
| 2,552,124 | Tallman | May 8, 1951 |
| 2,561,449 | Ruderman | July 24, 1951 |
| 2,563,288 | Steinman | Aug. 7, 1951 |
| 2,688,006 | Steinman | Aug. 31, 1954 |
| 2,877,501 | Bradt | Mar. 17, 1959 |
| 2,889,241 | Gregory et al. | June 2, 1959 |
| 2,990,307 | Stalego | June 27, 1961 |
| 3,042,569 | Paul | July 3, 1962 |
| 3,082,183 | Boyd | Mar. 19, 1963 |
| 3,085,080 | Ferrigno | Apr. 9, 1963 |